(12) United States Patent
Dunn et al.

(10) Patent No.: US 9,690,137 B2
(45) Date of Patent: Jun. 27, 2017

(54) AIRGUIDE BACKLIGHT ASSEMBLY

(71) Applicant: Manufacturing Resources International, Inc., Alpharetta, GA (US)

(72) Inventors: William Dunn, Alpharetta, GA (US); Harry Presley, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 14/322,962

(22) Filed: Jul. 3, 2014

(65) Prior Publication Data

US 2015/0009653 A1    Jan. 8, 2015

Related U.S. Application Data

(60) Provisional application No. 61/842,704, filed on Jul. 3, 2013.

(51) Int. Cl.
| | | |
|---|---|---|
| G09F 13/04 | (2006.01) | |
| G02F 1/1335 | (2006.01) | |
| F21V 8/00 | (2006.01) | |

(52) U.S. Cl.
CPC ....... G02F 1/133615 (2013.01); G02B 6/003 (2013.01); G02B 6/0031 (2013.01); G02B 6/0051 (2013.01); G02B 6/0096 (2013.01)

(58) Field of Classification Search
CPC ............ G02F 1/133615; G02B 6/0096; G02B 6/0051; G02B 6/0031; G02B 6/0036
USPC ....................................................... 362/97.1
See application file for complete search history.

(56) References Cited

U.S. PATENT DOCUMENTS

| | | | | |
|---|---|---|---|---|
| 4,257,084 | A * | 3/1981 | Reynolds ............... | G01D 11/28 116/288 |
| 5,040,878 | A * | 8/1991 | Eichenlaub ............... | F21V 5/00 348/E13.027 |
| 5,046,805 | A * | 9/1991 | Simon .................. | G02B 6/0008 385/31 |
| 5,453,855 | A * | 9/1995 | Nakamura ........... | G02B 6/0051 349/58 |
| 5,528,720 | A * | 6/1996 | Winston .................... | F21V 5/02 385/129 |
| 6,481,130 | B1 * | 11/2002 | Wu ......................... | F21V 13/04 362/297 |
| 7,473,019 | B2 * | 1/2009 | Laski ................. | G02F 1/133603 362/308 |
| 2002/0043012 | A1* | 4/2002 | Shibata .................. | B60Q 1/323 40/546 |
| 2004/0062029 | A1* | 4/2004 | Ato ...................... | G02B 6/0088 362/632 |

(Continued)

*Primary Examiner* — Bryon T Gyllstrom
(74) *Attorney, Agent, or Firm* — Standley Law Group LLP

(57) ABSTRACT

The exemplary embodiments herein provide an airguide backlight assembly having an anterior element, a reflective pan positioned posterior to the anterior element, and a light source positioned to direct light towards the reflective pan. A lens element may be placed in front of each light source. The reflective pan preferably contains a slope or curve so that light emitted from the light sources can be reflected and/or refracted to distribute the light uniformly to the anterior element. In some embodiments, blinders may be positioned between the light sources and the anterior element as well as between the light sources and the reflective pan.

23 Claims, 9 Drawing Sheets

(56) References Cited

U.S. PATENT DOCUMENTS

| | | | |
|---|---|---|---|
| 2009/0196069 A1* | 8/2009 | Iwasaki | G02B 6/0041 |
| | | | 362/613 |
| 2010/0253613 A1 | 10/2010 | Dunn | |
| 2012/0134139 A1 | 5/2012 | Jang | |
| 2012/0250329 A1* | 10/2012 | Suehiro | G02B 6/0085 |
| | | | 362/294 |
| 2012/0275023 A1 | 11/2012 | Weber | |
| 2012/0314447 A1* | 12/2012 | Huang | G02B 6/003 |
| | | | 362/602 |

* cited by examiner

AIRGUIDE BACKLIGHT ASSEMBLY

CROSS-REFERENCE TO RELATED APPLICATIONS

This application claims priority to U.S. Provisional Application No. 61/842,704 filed on Jul. 3, 2013, and is herein incorporated by reference in its entirety.

TECHNICAL FIELD

Embodiments generally relate to backlight assemblies.

BACKGROUND OF THE ART

Backlight assemblies are used in a number of different applications, ranging from dynamic electronic displays (ex. liquid crystal displays) to static backlight displays (ex. a backlight positioned behind a poster or static graphic). Typically, for edge-lit assemblies (where the light source is placed around the outside edges of the assembly) a light guide is used to capture the light, homogenize, and out-couple the light from the light sources.

SUMMARY OF THE EXEMPLARY EMBODIMENTS

Exemplary embodiments provide a backlight assembly using only air as the light guide ('airguide') where a lens is used to capture the light and a pan is used to homogenize and out-couple the light. The pan can have constant reflectivity, or reflectivity which changes based on the location within the pan. The pan can have features, including ramps, cylindrical curves, sinusoidal curves, arbitrarily optimized curves, or a hybrid of any of these shapes in order to homogenize and out-couple the light. In some embodiments, blinders may be positioned above and below the light sources to further control the emission and distribution of light.

The various embodiments of the airguide backlight assembly described herein can be used with any device that requires a backlight, including but not limited to LCD displays and static displays. The light sources used with any of the embodiments herein can be any device for generating photons, including fluorescent tubes, LEDs, organic LEDs, or light emitting polymers.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
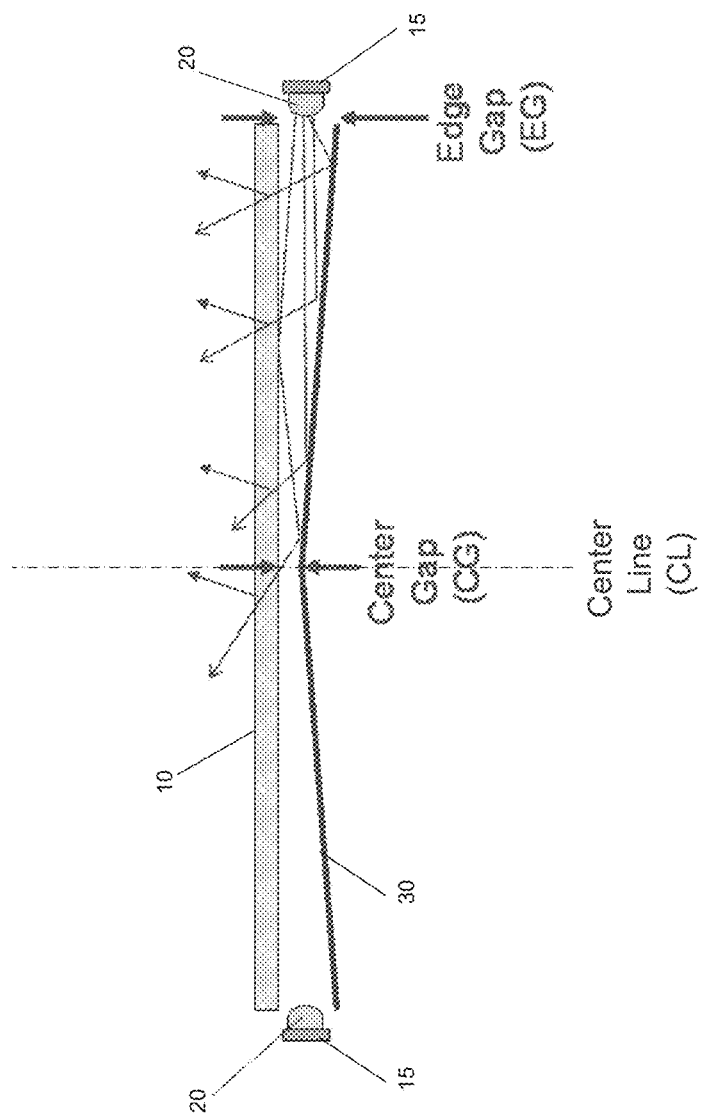
FIG. 1 is a side elevation view of an exemplary embodiment of an airguide backlight assembly.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a side elevation view of an exemplary embodiment of an airguide backlight assembly. An anterior element 10 may be positioned at the front portion of the assembly (i.e. the anterior side of the backlight assembly that would face an intended observer) and may include any one or a combination of the following: clear or frosted glass or plastic, a diffusing element, brightness enhancing films, anti-reflective films, liquid crystal cells, posters/static graphics, etc. Preferably, the anterior element 10 is at least semi-transparent. The light source 15 is positioned along the edge of the assembly, preferably with another light source 15 on the opposing side. A lens 20 is preferably positioned in front of the light source 15 and may be used to at least partially collimate the light.

There are no practical limits on the type of lens that may be used with the embodiments herein, assuming that a lens is required for the chosen light source. This may include convex-convex, plano-convex, cylindrical rods, gradient-index, and Fresnel lens.

A reflective pan 30 is positioned behind the anterior element 10 and within the path of the light passing through the lens 20. In this embodiment, the reflective pan 30 has a simple ramp design where two primary variables control the performance of the reflective pan 30: a Center Gap (CG) and an Edge Gap (EG). The Center Gap (CG) may be defined as the distance from the pan 30 to the rear surface of the anterior element 10, when measured along the Centerline (CL). The Edge Gap (EG) may be defined as the distance from the pan 30 to the rear surface of the anterior element 10, when measured at the edge of the pan 30 and anterior element 10 where the light source 15 is positioned. By way of example, the CG distance is often on the order of 60-90% of the EG distance.

Figure 2:
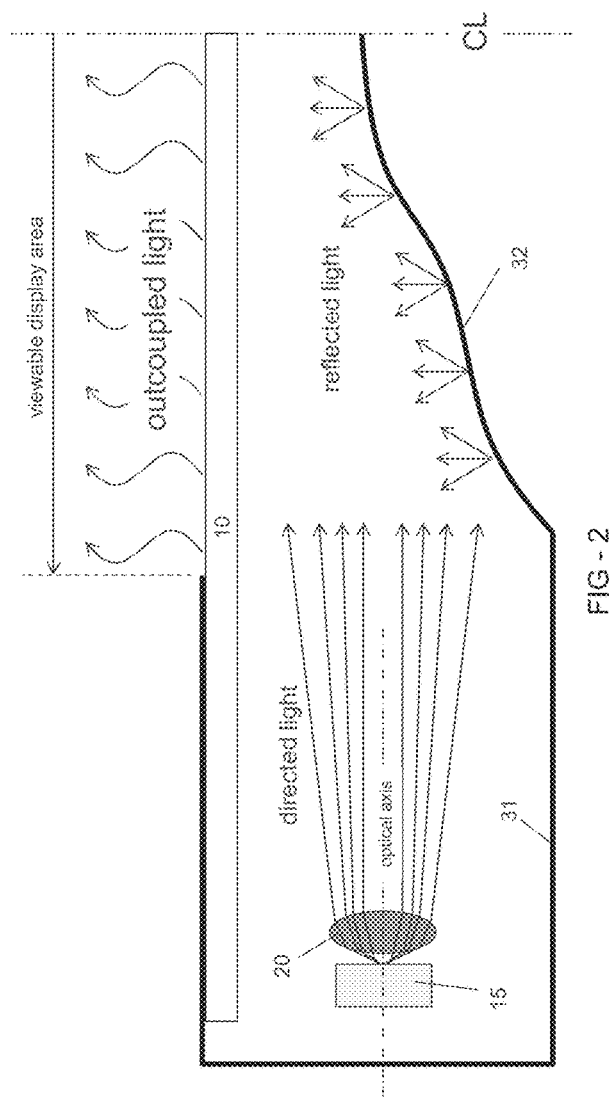
FIG. 2 is a partial side elevation view of an embodiment of an airguide backlight assembly using a reflective pan having an optimized curvature.

FIG. 2 is a partial side elevation view of an embodiment of an airguide backlight assembly using a reflective pan 31 having an optimized curvature 32. An optimized curvature would generally serve to transform the distribution of light as it exits the light source 20 to the desired distribution of light over the viewing area, which is typically a uniform distribution. The distribution of light as it exits the light source at 20 is generally not uniform. Thereby, the shape of the pan 32 is designed to compensate for the nonuniformity of the light source while simultaneously and conveniently reflecting the light in a predominately outward direction through anterior element 10. Clearly, the complexity of the shape of the pan 32 depends on: 1) the nonuniformity of the light exiting the light source at 20 that must be compensated, and 2) the degree to which the desired viewing area distribution is satisfied. More specifically, the pan may intrinsically reflect more light outward where the light striking it from the light source is weaker, and vice versa. Alternatively and/or simultaneously, in areas where the light striking the pan 32 is relatively stronger the pan 32 may direct light to regions of the viewing area that would otherwise be relatively weaker. A similar effect may be obtained by varying the reflectivity of the pan 32 at different locations along the pan 32.

Clearly, there is a very large degree of optimization that is potentially possible by the shape of the pan 32. Although the shape of the pan 32 is shown as being contiguous, this is not strictly a requirement. In other words, the shape may have discontinuities such as bent edges, or even formed in discrete sections.

The surface texture of the pan 32 is another variable that can be used to optimize the distribution of light at the viewing area. A smoother texture will tend to 'specularly' reflect light like a common mirror does, while a rougher texture will 'broadcast' the light over a wider range of angles. The surface texture may also vary at different locations along the pan 32.

Figure 3:
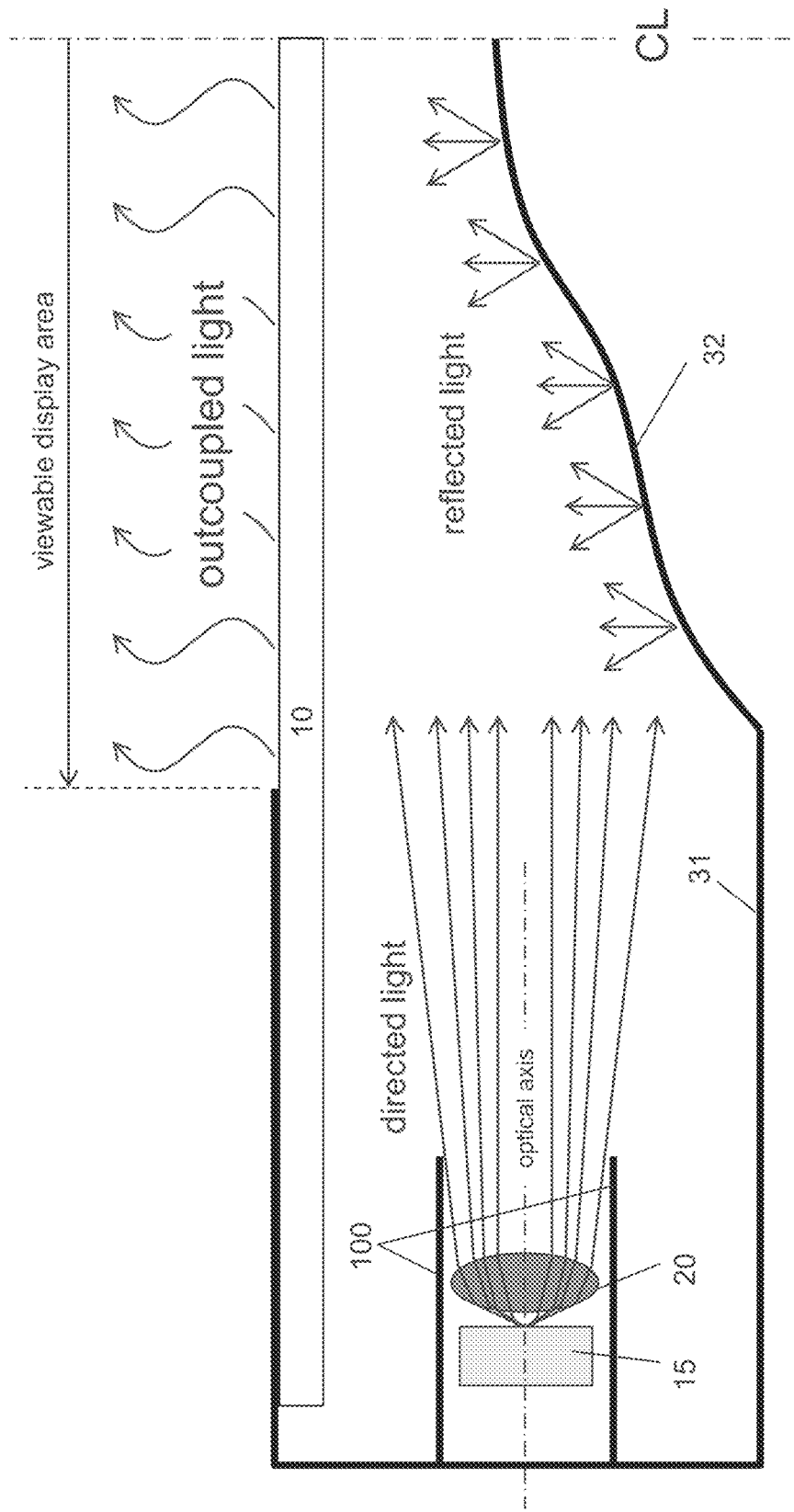
FIG. 3 is a partial side elevation view of an embodiment of an airguide backlight assembly using blinders around the light source.

FIG. 3 is a partial side elevation view of an embodiment of an airguide backlight assembly using blinders 100 around the light source 15. The blinders 100 are preferably placed above and below the light source 15 and lens 20. In other words, a top blinder may be positioned between the anterior element 10 and the light source 15 while a bottom blinder may be positioned between the pan 31 and the light source 15. The blinders 100 may have any value of reflectivity, from 0-100%, which serves to aid in the desired distribution of light at the viewing area. A preferred use of blinders 100 is to selectively control stray light as it exits the light source at 20.

Figure 4:
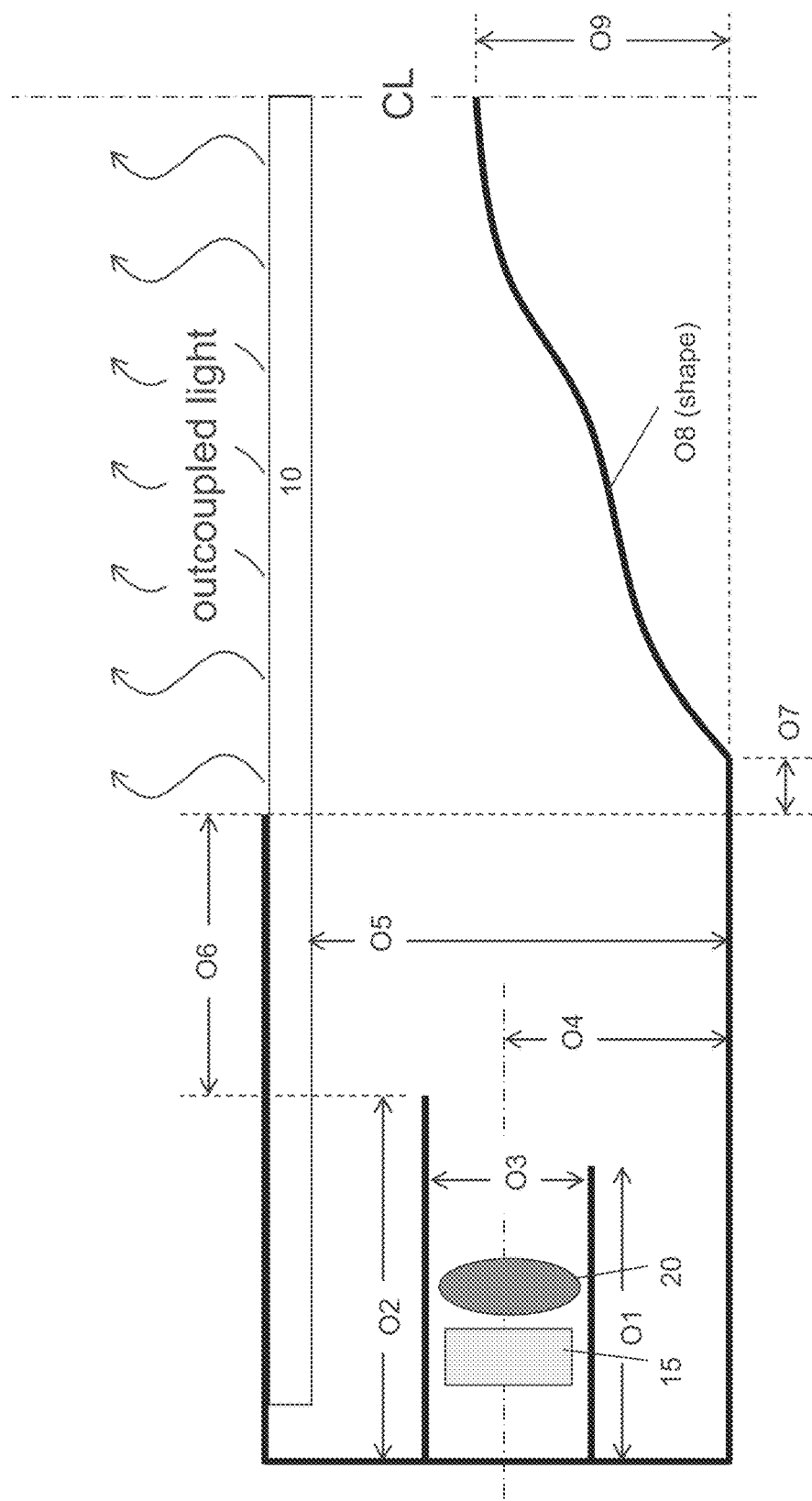
FIG. 4 is a partial side elevation view of an embodiment of an airguide backlight assembly showing the variables in the design which can be used for optimization.

FIG. 4 is a partial side elevation view of an embodiment of an airguide backlight assembly showing the variables in the design which can be used for optimization.

Figure 5:
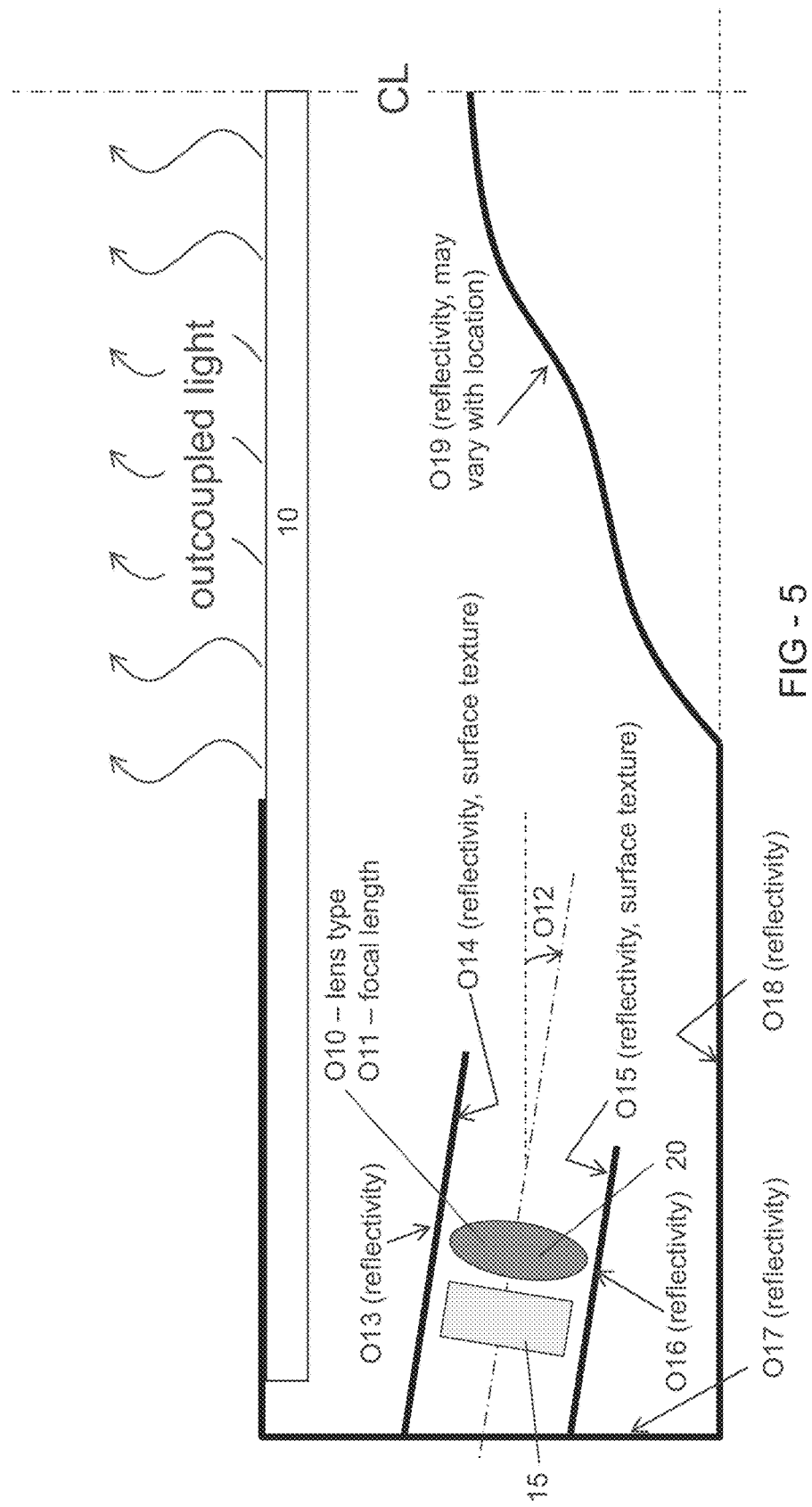
FIG. 5 is a partial side elevation view of an embodiment of an airguide backlight assembly showing further variables in the design, including a light source having its optical axis positioned at an angle relative to the display.

FIG. 5 is a partial side elevation view of an embodiment of an airguide backlight assembly showing further variables in the design, including a light source 15 having its optical axis positioned at an angle relative to the anterior element 10.

Figure 6:
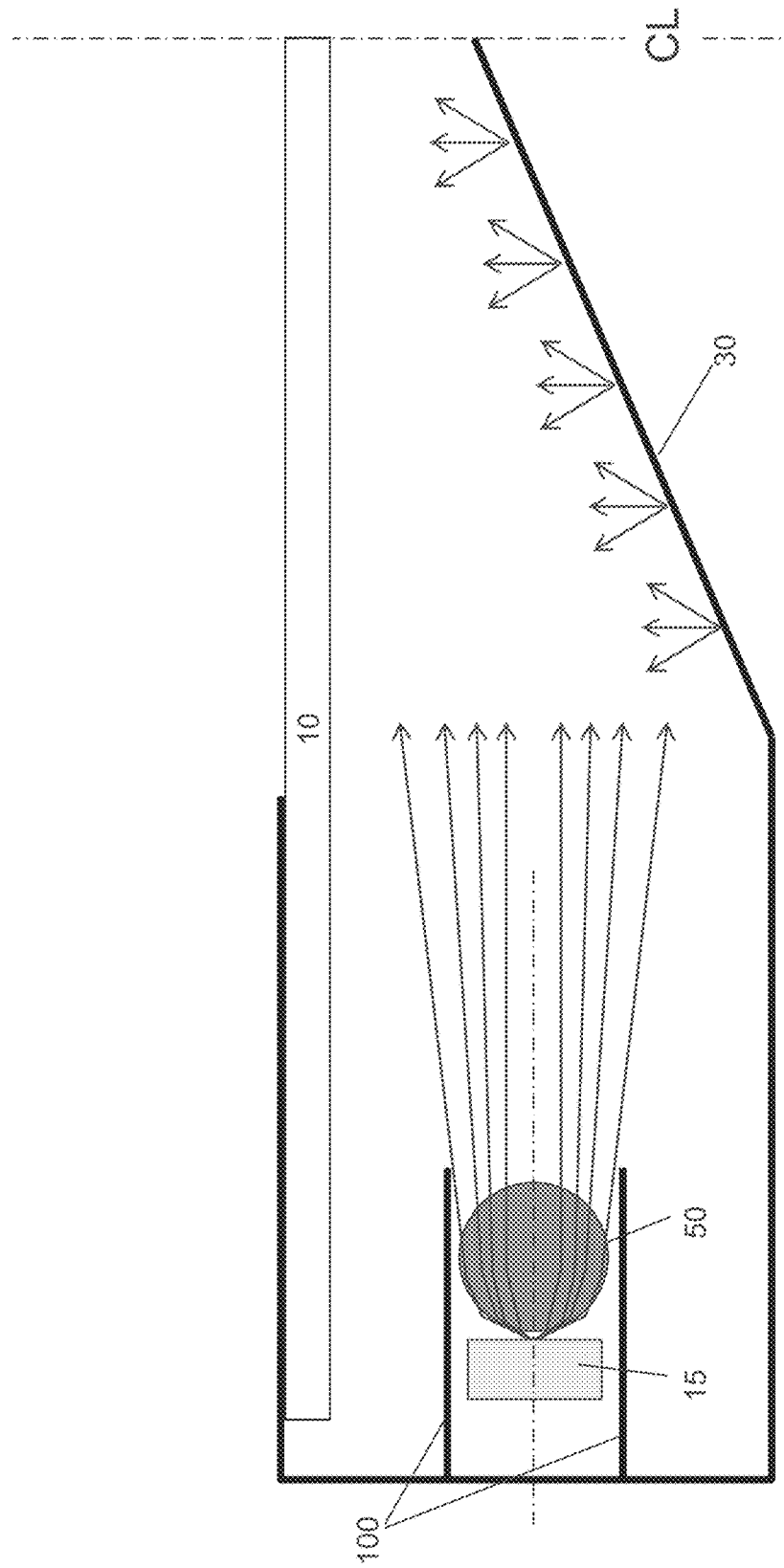
FIG. 6 is a partial side elevation view of an embodiment of an airguide backlight assembly using a ramped reflective pan and a rod lens.

FIG. 6 is a partial side elevation view of an embodiment of an airguide backlight assembly using a simple ramped reflective pan 30 and a simple rod that serves as the lens 50. This embodiment illustrates, by way of example, the invention in perhaps its most simplistic form.

Figure 7:
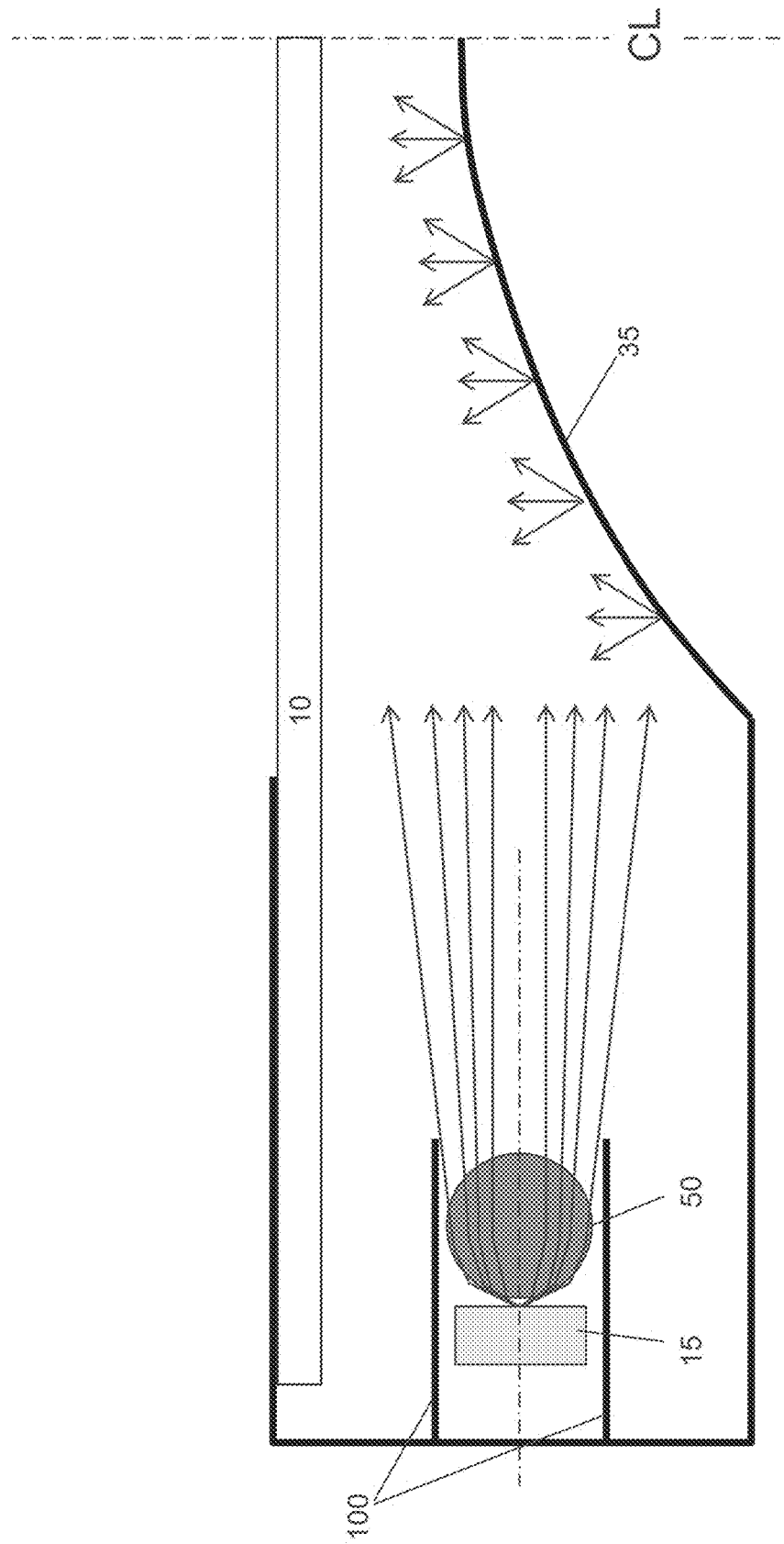
FIG. 7 is a partial side elevation view of an embodiment of an airguide backlight assembly using a cylindrical reflective pan and a rod lens.

FIG. 7 is a partial side elevation view of an embodiment of an airguide backlight assembly using a cylindrical reflective pan 35 and a rod lens 50.

Figure 8:
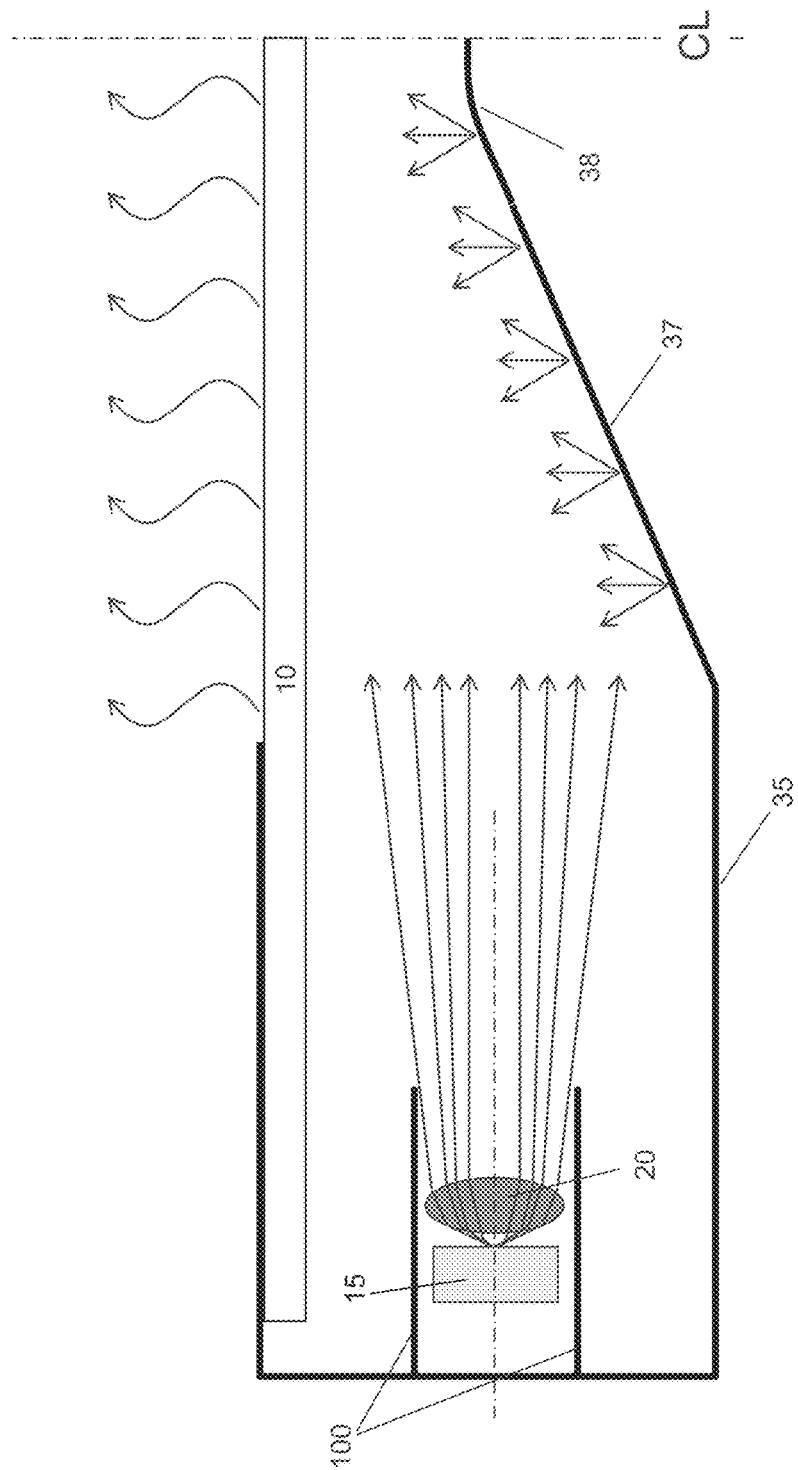
FIG. 8 is a partial side elevation view of an embodiment of an airguide backlight assembly using a hybrid curved ramped reflective pan.

FIG. 8 is a partial side elevation view of an embodiment of an airguide backlight assembly using a hybrid curved ramped reflective pan 36, which begins with a ramp section 37 and transitions to a curved section 38 as you approach the centerline of the backlight assembly.

Figure 9:
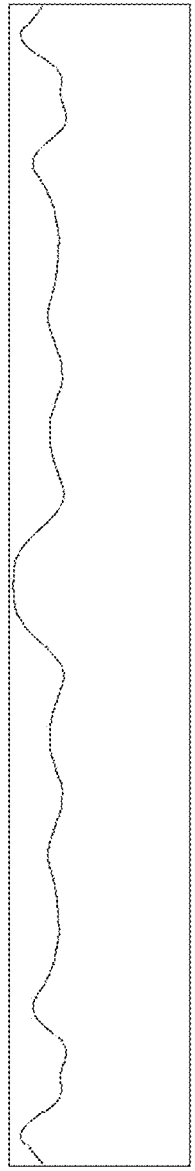
FIG. 9 is an illustration of the light distribution generated by the embodiment shown in FIG. 6.

FIG. 9 is an illustration of the light distribution generated by the embodiment shown in FIG. 6. This illustration was produced using light modeling software ASAP, which is available from Breault Research Organization. This simulation was performed with no diffuser placed into the model.

Figure 10:
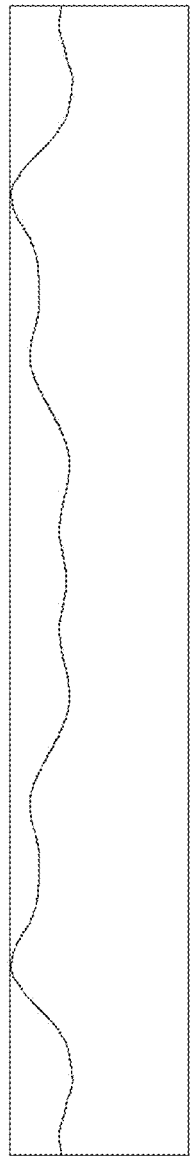
FIG. 10 is an illustration of the light distribution generated by the embodiment shown in FIG. 7.

FIG. 10 is an illustration of the light distribution generated by the embodiment shown in FIG. 7. This simulation was performed with no diffuser placed into the model.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. An airguide backlight assembly comprising:
   a transparent anterior element;
   a layer of liquid crystal cells positioned anterior to the anterior element;
   a reflective pan positioned posterior to the anterior element and having a curved cross-sectional profile and a centerline where the reflective pan contains both concave and convex portions on both sides of the centerline so that the reflective pan contains a total of two or more convex portions, the convex portions having a surface and wherein the entire surface of the convex portions are reflective; and
   a light source positioned to direct light towards the reflective pan.

2. The airguide backlight assembly of claim 1 further comprising:
   a lens placed adjacent to the light source.
3. The airguide backlight assembly of claim 2 wherein:
   the lens is a transparent rod.
4. The airguide backlight assembly of claim 1 wherein:
   the reflective pan has a center portion which is closer to the anterior element than the remaining portions of the reflective pan.
5. The airguide backlight assembly of claim 1 wherein:
   the reflective pan is sloped towards the anterior element as you move from a perimeter portion of the pan towards a center portion.
6. The airguide backlight assembly of claim 1 further comprising:
   a first blinder placed between the light source and the anterior element; and
   a second blinder placed between the reflective pan and the light source.
7. The airguide backlight assembly of claim 6, wherein the first and second blinders extend past the lens.
8. The airguide backlight assembly of claim 6, wherein the first blinder is longer than the second blinder.
9. The airguide backlight assembly of claim 1 wherein:
   the reflective pan has a textured surface facing the anterior element.
10. The airguide backlight assembly of claim 1 wherein:
    the anterior element is a diffusing element.
11. An airguide backlight assembly comprising:
    a transparent anterior element having a pair of opposing edges and a centerline;
    a first plurality of light sources placed along one of the opposing edges;
    a second plurality of light sources placed along the opposite opposing edge as the first plurality of light sources;
    a lens element placed in front of each light source; and
    a reflective pan positioned posterior to the anterior element where the distance from the anterior element to the reflective pan varies across the reflective pan and is the smallest when measured along the centerline and where the pan contains both convex and concave surfaces on both sides of the centerline so that the reflective pan contains a total of two or more convex portions, the convex portions having a surface and wherein the entire surface of the convex portions are reflective.
12. The airguide backlight assembly of claim 11 further comprising:
    a first blinder placed between the light source and the anterior element; and
    a second blinder placed between the reflective pan and the light source.
13. The airguide backlight assembly of claim 12, wherein the first and second blinders extend past the lens.
14. The airguide backlight assembly of claim 12, wherein the first blinder is longer than the second blinder.
15. The airguide backlight assembly of claim 11 wherein:
    the anterior element contains a static graphic.
16. The airguide backlight assembly of claim 11 wherein:
    the light sources have an optical axis that is substantially parallel to the anterior element.
17. The airguide backlight assembly of claim 11 wherein:
    the light sources have an optical axis that is angled away from the anterior element and towards the reflective pan.
18. An airguide backlight assembly comprising:
    a transparent anterior element having a rear surface, a pair of opposing edges, and a centerline;
    a first plurality of light sources placed along one of the opposing edges;
    a second plurality of light sources placed along the opposite opposing edge as the first plurality of light sources;
    a lens element placed in front of each light source; and
    a reflective pan positioned posterior to the anterior element where a center gap (CG) is defined as the distance from the reflective pan to the rear surface of the anterior element when measured along the centerline and an edge gap (EG) is defined as the distance from the reflective pan to the rear surface of the anterior element when measured along one of the opposing edges;
    wherein the CG is smaller than the EG and the pan contains both convex and concave surfaces on both sides of the centerline so that the reflective pan contains a total of two or more convex portions, the convex portions having a surface and wherein the entire surface of the convex portions are reflective.
19. The airguide backlight assembly of claim 18 wherein:
    the CG is 60%-90% of the EG.
20. The airguide backlight assembly of claim 18 wherein:
    the reflective pan is curved to provide a substantially uniform distribution of the reflected light from the light source through the anterior element.
21. The airguide backlight assembly of claim 18 further comprising:
    a first blinder placed between the first plurality of light sources and the anterior element; and
    a second blinder placed between the reflective pan and the first plurality of light sources.
22. The airguide backlight assembly of claim 21, wherein the first and second blinders extend past the lens.
23. The airguide backlight assembly of claim 21, wherein the first blinder is longer than the second blinder.

* * * * *